United States Patent [19]

Massa et al.

[11] Patent Number: 5,737,551
[45] Date of Patent: Apr. 7, 1998

[54] SWITCHING CIRCUIT FOR COMPUTER/ DATA ACQUISITION TERMINAL

[75] Inventors: Raymond Massa, Birmingham; Michael Stowowy, Bloomfield Hills, both of Mich.

[73] Assignee: Cascade Technology Corp., Inc., Farmington Hills, Mich.

[21] Appl. No.: 345,846

[22] Filed: Nov. 28, 1994

[51] Int. Cl.[6] .................................................. G06F 15/16
[52] U.S. Cl. ............................ 395/311; 395/309; 395/858
[58] Field of Search ................................. 395/311, 309, 395/828, 858

[56] References Cited

U.S. PATENT DOCUMENTS

| | | | |
|---|---|---|---|
| 4,317,199 | 2/1982 | Winslow | 395/183.06 |
| 4,698,753 | 10/1987 | Hubbins et al. | 395/200.05 |
| 4,744,078 | 5/1988 | Kowalczyk | 370/85.9 |
| 5,313,051 | 5/1994 | Brigida et al. | 235/375 |
| 5,496,992 | 3/1996 | Madan et al. | 235/462 |
| 5,537,343 | 7/1996 | Kikinis et al. | 364/708.1 |

*Primary Examiner*—Glenn A. Auve

[57] ABSTRACT

A circuit for switching a computer between a stand alone mode and a data acquisition mode for a host computer. The switching circuit automatically switches to the data acquisition mode when the device is electrically coupled to a host computer. The switching circuit is further adapted to prevent disallowed stand alone functions while the computer is in the data acquisition mode.

8 Claims, 2 Drawing Sheets

SWITCHING CIRCUIT FOR COMPUTER/ DATA ACQUISITION TERMINAL

TECHNICAL FIELD

This invention relates in general to switching circuits, and more particularly to switching circuits adapted to switch a computing device from a data acquisition terminal mode to a stand alone computer mode.

BACKGROUND

In recent years makers of personal computers have expended substantial effort to reduce the size of computer products, resulting in a wide variety of easily portable products such as notebook computers, palm-top computers, and personal digital assistants. While the size of the product has decreased, the ruggedness and durability of the product has often suffered. This is particularly true in cases in which it is necessary to take a computer into a harsh environment, such as a shop floor, or onto an automotive test vehicle being exposed to rigorous testing.

Similarly, many portable computers are not sufficiently equipped in terms of memory or sensing capabilities to perform the tasks necessary for "in-the-field" testing. Examples of such testing include automotive analysis of new, prototype vehicles which are being evaluated for performance, stress management, noise management, and a host of other criteria. Conventional portable computers are not capable of monitoring and recording all of the inputs from the various sensors placed throughout the vehicle. Accordingly, more powerful computers are often mounted in the vehicle to collect and process the information. These computers are often coupled to data acquisition terminals to allow a technician to monitor the inputs being collected by the host computer.

A flaw inherent in this type of system is that the information collected by a host computer mounted in, for example, the automobile, cannot be conveniently used or transported out of the system. The collected data must be saved onto memory media and loaded into another computer, such as a desktop model so that the information may be used, analyzed, and manipulated. This flaw is the result of the fact that the data acquisition terminal has heretofore been a "dumb" unit, unable to operate independently of the computer. That is, the terminal was little more than a ruggedized cathode ray tube adapted to display information generated by the computer.

Conventional portable computers offer the computing power necessary to use and manipulate collected data. However such devices could not be connected to a host computer mounted in the test platform. This is due to the fact that a conventional portable computer can be severely damaged when two signal sources, such as from the host computer and the computer microprocessor, are simultaneously trying to control the computer display, keyboard, mouse, and other computer equipment.

Accordingly there exists a need to provide a portable computer capable of switching between a stand alone computer mode, and a data acquisition terminal mode. Such a device should be equipped with means capable of automatically sensing when the computer is electrically coupled to a host computer, and disabling the computer's internal processor while so coupled.

SUMMARY OF THE INVENTION

Briefly, according to the invention, there is provided a circuit for automatically switching a computer, such as a personal portable computer, between a stand alone mode and a data acquisition mode for a host computer. Such a circuit should provide at least three main functions: to act as a master switch between stand alone and data acquisition modes; to provide safeguard logic preventing any disallowed functions for a given mode (such as the on-board processor operating while connected to the host computer); and to convert analog video to digital LCD matrix signals. Video conversion is necessary to provide total compatibility with current personal computers. The circuit automatically switches between modes as soon as the host computer is electrically coupled to the device.

Further according to the invention, there is provided a computer device including the switching circuit described above.

DETAILED DESCRIPTION OF THE PREFERRED EMBODIMENT

Figure 1:
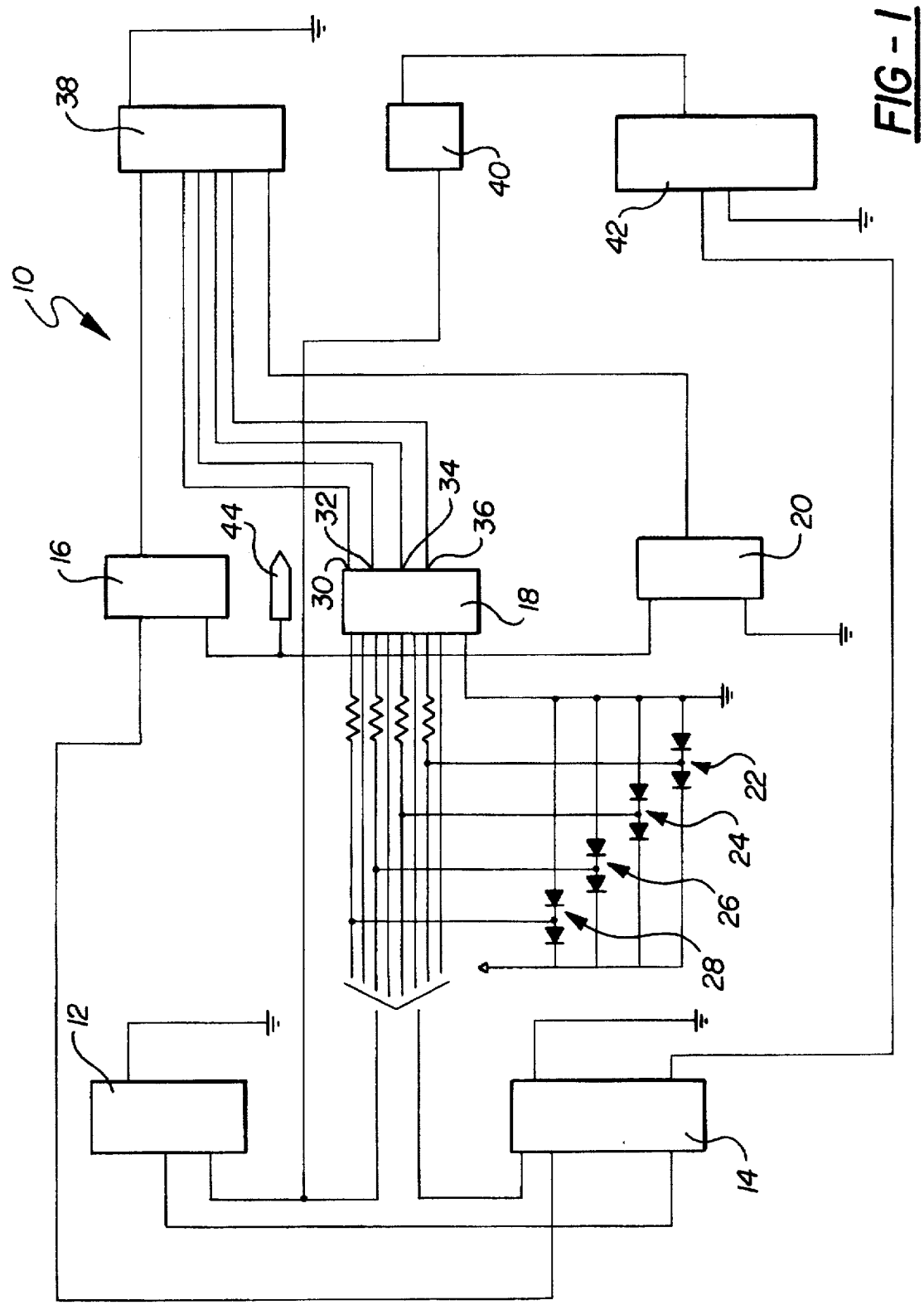
FIG. 1 is a circuit diagram of a switching circuit in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Figure 2:
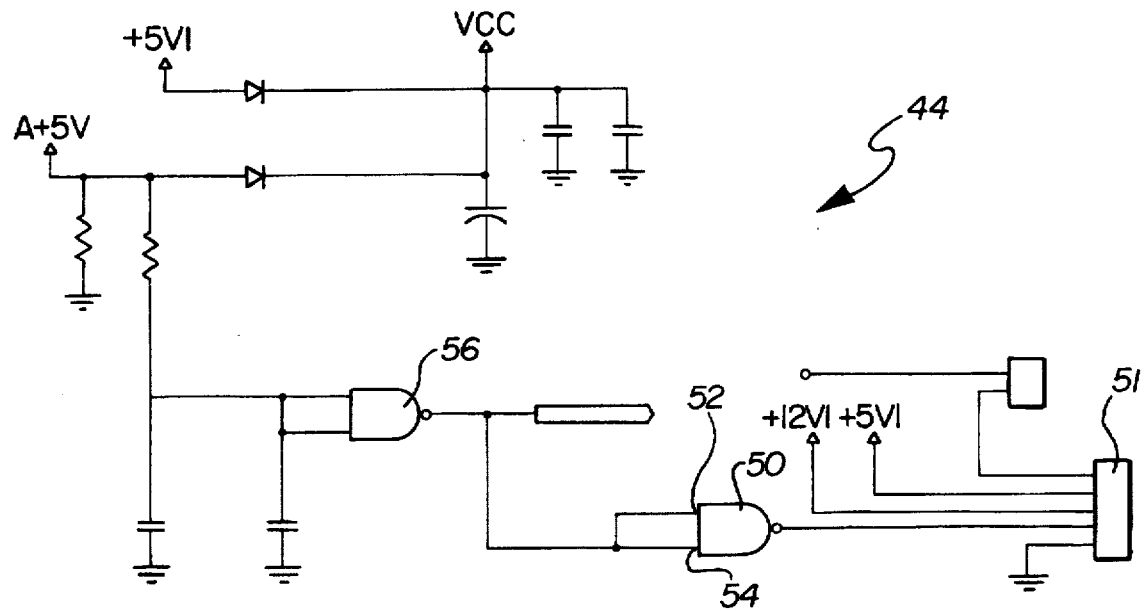
FIG. 2 is a circuit diagram of a a switch incorporated into the switching circuit of FIG. 1, in accordance with the instant invention.

Referring now to FIGS. 1 and 2, there is illustrated therein the circuit diagram of a switching circuit 10 in accordance with the instant invention. FIG. 1 illustrates the circuit components necessary for the circuit to discern the source of an input signal, and channel the input signal to various peripheral units. FIG. 2 illustrates the circuit components necessary for a switching circuit to change the operation of a stand alone computer into which the circuit is incorporated, from a data acquisition mode in which the computer incorporating the circuit acts in response to a host computer, to a stand alone mode, in which the computer into which the circuit is incorporated acts in response to its internal microprocessor.

In FIG. 1, input 12 represents the information which is input to a computer incorporating the circuit 10, from a remote host computer. Information from this source will cause the computer into which the switching circuit is incorporated to operate in the data acquisition mode. Similarly, input 14 is the information input from the computer into which the circuit is incorporated's own internal microprocessor. Each of inputs 12 and 14 has a plurality of data lines. Each data line is electronically coupled to at least one of three multiplexing chips 16, 18, 20. The multiplexing chips may be 74HCT157 quad 2 to 1 multiplexing chips commercially available from National Semiconductor Corp., among others, and function as switches. Each of the multiplexing chips 16, 18, 20 has at least eight (8) and preferably at least 10 inputs. The inputs may also include conditioned input clamping diode pairs, such as diode pairs 22, 24, 26, 28 attached to inputs connected to multiplexing chip 18. Such pairs are not necessary for all inputs, if the information input is stable. Hence diode pairs are necessary for only certain inputs.

Each of the multiplexing chips 16, 18, 20 has a plurality of outputs, such as outputs 30, 32, 34, 36 on multiplexing chip 18. The outputs from multiplexing chips 16, 18, 20 are electronically coupled to a controller 38 for shunting signals from either a host computer, or a stand alone computer to a display, such as a liquid crystal display. Data lines from inputs 12 and 14 are also electronically coupled to a second controller 40 for shunting signals from either a host computer, or a stand alone computer to an input device, such as a mouse, while yet another controller 42 shunts signals for the keyboard of the computer. Controller 42 may also be independently electronically coupled to each of inputs 12 and 14. The circuit 10 further includes a switching element 44 electronically coupled to each of said multiplexing chips. The switching element 44 is further described with respect to FIG. 2.

FIG. 2 is a circuit diagram of the switching element 44 of FIG. 1. The switch element 44 generates a control signal which is derived from an AND gate 50 connected to a power source 51 of the computer into which the circuit is incorporated. The inputs 52, 54 to this gate are tied together and are connected to the output of a second AND gate 56. The inputs of this gate are controlled by the presence of an outside +12 V voltage from input 12 which would emanate from a users remote host computer. If this voltage is present, the switch will switch to the terminal mode. If no voltage is present at the input of gate 56, then the computer into which the circuit is incorporated will act in the stand alone mode. The computer will also be turned-on through the use of the manual ON/OFF power switch to act as a self contained computer.

Figure 3:
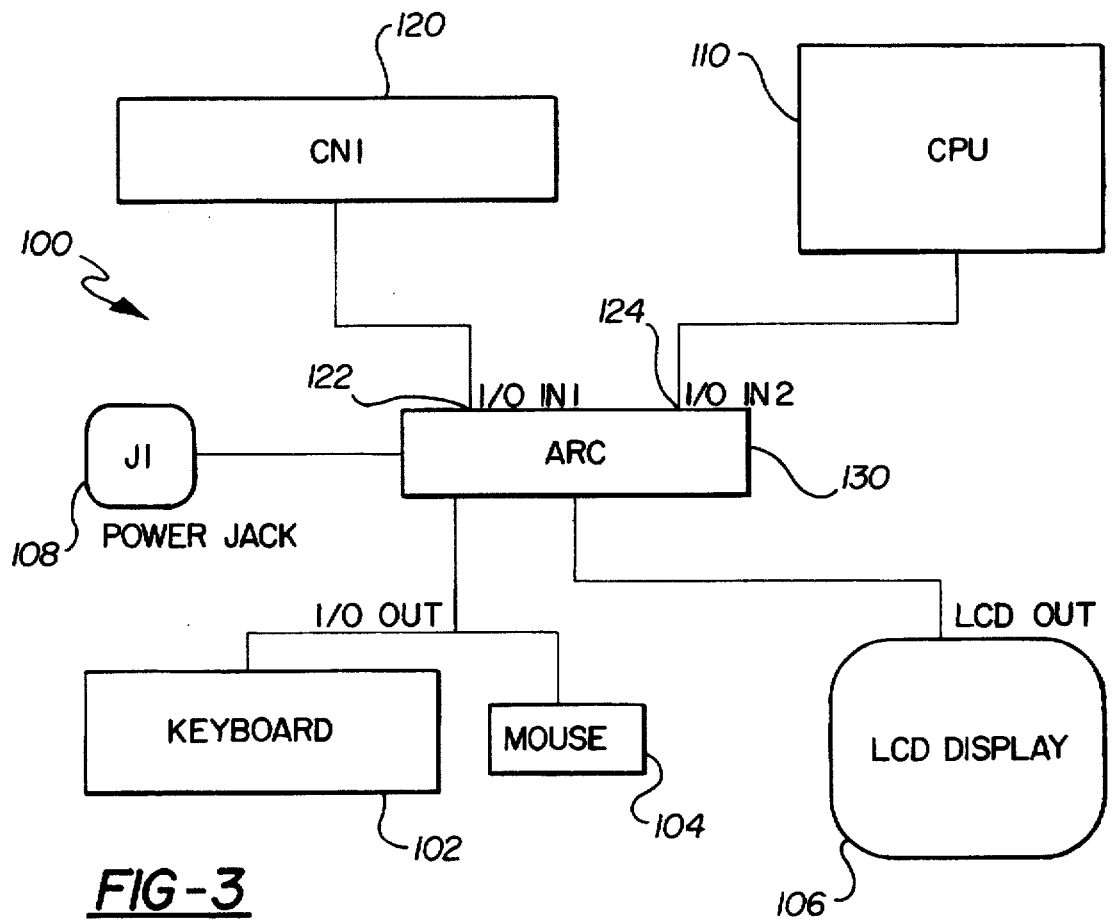
FIG. 3 is a block diagram illustrating the function of a computer including a switching circuit in accordance with the instant invention.

Referring now to FIG. 3, there is illustrated therein a block diagram illustrating the function of a computer including a switching circuit in accordance with the instant invention. While the computer illustrated herein is described generally, in a preferred embodiment the computer is an Intel "486" compatible computer equipped with the switching circuitry described herein. The computer 100 may be a conventional portable computer equipped with a standard Intel 486 (or related) microprocessor. While an Intel standard microprocessor is described, it is to be understood that other microprocessor may be used in connection with the instant invention.

The computer 100 is further equipped with standard input/output devices such as a keyboard 102, mouse 104, and display 106, and a port for coupling a power supply 108. The computer 100 further includes an internal microprocessor 110 which controls the functions of the other elements in a manner known in the art. The computer also includes an input port 120 for electrically coupling the computer 100 to a host computer 120.

The computer 100 further includes a switching circuit 130 as described above in FIGS. 1 and 2. The switching circuit 130 is electrically coupled to the host computer 120 via input port 122. Similarly, the switching circuit 130 is coupled to the microprocessor 110 via input port 124. The switch 130 is also electrically coupled to the input/output devices 102, 104, 106, and 108.

The switch 130 manages 20 or more lines of data signals and ground lines from either data source, to their proper and appropriate destinations. This is done while also assuring that no lines short out to any other existing source. The switch 130 also conditions the data lines so that no spurious signals or loss of signal strength is introduced into the system.

The switching circuit 130 accomplishes these and other functions by employing 74HCT157 quad 2 to 1 multiplexing chips commercially available from National Semiconductor Corp., among others, as switches, along with conditioned inputs clamping diodes, all as described hereinabove with respect to FIG. 1. The switch 130 works as follows: Input port 122 provides for input from all end user remote computer signals, including the input/output devices 102, 104, 106. The power supply 108 provides incoming power to the unit, such as +12 VDC. This set of inputs will be referred to hereinafter as the "Terminal Mode". The internal processor, peripherals and associated video circuitry will be referred to as the "Computer Mode". Since both modes will share the display 106, the keyboard 102 and the mouse 104, the switching circuit 130 must smoothly control the flow of data from either and both sources.

When an active interconnect cable from a host computer 120 is attached to the switch via input port 122, the switch 130 will automatically sense the incoming signals, and protect the internal circuits from potential conflicts and damage by enabling the Terminal Mode, and disabling the Computer Mode, even if the computer 100 had previously been turned on, and functioning in the Computer Mode. If the interconnected cable is not activated, i.e., if the host computer is not sending data along the cable, the switch circuit 130 will not be required to take any action.

Power distribution through the switch 130 is handled as follows: The power from the internal systems, such as +5 volts from a standard motherboard connection, and the power supplied from the host computer via input port 122 are combined through diode pairs as identified in FIG. 1. This provides power for all of the input/output devices. Power from the Terminal Mode supply is logically OR'ed with the DC input from power supply 108 to provide power to the display 106.

In operation, the circuit handles the switching through the three 74HCT157 multiplexor chips. Each multiplexor is capable of switching four data lines, and acts as an electronic 4-pole, double throw relay. Input signals from the terminal mode are directed to certain inputs of each mutiplexor chip. Conditioning is not necessary for these inputs, since they emanate from a stable CPU processor board. The common output of the multiplexor chips are routed to the display, keyboard and mouse, since these three devices are the common components in either the computer or terminal mode.

To control which mode the device will be in, a control voltage is applied to the "switch" input line of each multiplexor in a parallel fashion. With no logic voltage applied to the switch input, the system will default to the terminal mode. When a positive signal voltage is applied to the switch input line of the multiplexor, the device will automatically switch to the computer mode, and lock out all data signals from other input sources. In order for the device to switch to the computer mode, two things must happen: All power signals from the remote input connector, source 1, must cease, and the ON/OFF switch of the computer must be in the ON position. The device will immediately switch to the terminal mode is any of the conditions are no longer met. This will prevent the inadvertent "collision" of voltages from both input circuits.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electronic circuit for switching the control of a plurality of computer peripheral devices between a data acquisition mode and a stand alone mode, said circuit comprising:

a first plurality of inputs connected to a host computer for data acquisition mode operation, and a second plurality of inputs connected to a stand alone computer for stand alone mode operation;

a plurality of multiplexing chips electronically coupled to said inputs, said multiplexing chips adapted to shunt signals from said host computer and said stand alone computer to said plurality of computer peripheral devices;

a switching element including at least two logic gates, said switching element being electronically coupled to said multiplexing chips, and responsive to an external voltage supplied by said stand alone computer; and a plurality of stabilizing elements electronically coupled to at least some of said first and second inputs, wherein said stabilizing elements are clamping diode pairs.

2. An electronic circuit as in claim 1, wherein said multiplexing chips include a plurality of outputs.

3. An electronic circuit as in claim 2, wherein said multiplexing chip outputs are electronically coupled to control elements adapted to control said computer peripheral devices.

4. An electronic circuit as in claim 1, wherein said computer peripherals include a keyboard, a mouse, a memory, a display, or combinations thereof.

5. A computing system capable of operating in either a stand alone mode, or with a host device, said system including:

a plurality of computer peripheral devices electronically coupled to both a host computer device and a stand alone computer; and a circuit interposed between said computer peripherals devices and said host and stand alone computers, said circuit comprising a first plurality of inputs connected to the host computer for data acquisition mode operation, and a second plurality of inputs connected to the stand alone computer for stand alone mode operation;

a plurality of multiplexing chips electronically coupled to said inputs, said multiplexing chips adapted to shunt signals from said host computer and said stand alone computer to said plurality of computer peripheral devices;

a switching element including at least two logic gates, said switching element being electronically coupled to said multiplexing chips, and responsive to an external voltage supplied by said stand alone computer; and a plurality of stabilizing elements electronically coupled to at least some of said first and second inputs, wherein said stabilizing elements are clamping diode pairs.

6. A computing system as in claim 5, wherein said multiplexing chips include a plurality of outputs.

7. A computing system as in claim 6, wherein said multiplexing chip outputs are electronically coupled to control elements adapted to control said computer peripheral devices.

8. A computing system as in claim 5, wherein said computer peripherals include a keyboard, a mouse, a memory, a display, or combinations thereof.

* * * * *